United States Patent [19]

Siskin

[11] 4,043,900

[45] Aug. 23, 1977

[54] HYDRODESULFURIZATION WITH A METAL HALIDE-HYDROGEN HALIDE CATALYST

[75] Inventor: Michael Siskin, Maplewood, N.J.

[73] Assignee: Exxon Research and Engineering Company, Linden, N.J.

[21] Appl. No.: 628,588

[22] Filed: Nov. 4, 1975

[51] Int. Cl.$^2$ ............................................. C10G 23/02
[52] U.S. Cl. ............................................................ 208/216
[58] Field of Search .............. 208/216, 213, 223, 225, 208/243, 249, 241, 248, 245, 209, 208 R, 280

[56] References Cited

U.S. PATENT DOCUMENTS

| | | | |
|---|---|---|---|
| 1,948,528 | 2/1934 | Malisoff | 208/248 |
| 2,356,095 | 8/1944 | Schulze | 208/248 |
| 2,373,227 | 4/1945 | Danforth | 208/248 |
| 2,464,520 | 3/1949 | Lien et al. | 208/223 |
| 2,465,964 | 3/1949 | Brooke et al. | 208/223 |
| 2,683,763 | 7/1954 | Lien et al. | 208/280 |
| 2,683,764 | 7/1954 | Lien et al. | 208/280 |
| 2,689,207 | 9/1954 | Gerald | 208/241 |
| 2,729,590 | 1/1956 | Bishop et al. | 208/241 |

*Primary Examiner*—George Crasanakis
*Attorney, Agent, or Firm*—John W. Ditsler

[57] ABSTRACT

Organic sulfur compounds are removed from hydrocarbon feedstocks by contacting said feedstocks with a catalyst system comprising a difficultly reducible metal halide and a hydrogen halide, said contacting being done in the presence of hydrogen. The preferred metal halide is tantalum pentafluoride, niobium pentafluoride or mixtures thereof. The preferred hydrogen halide is hydrogen fluoride.

20 Claims, No Drawings

HYDRODESULFURIZATION WITH A METAL HALIDE-HYDROGEN HALIDE CATALYST

BACKGROUND OF THE INVENTION

1. Field of the Invention

The present invention relates to a process for refining sulfur contaminated hydrocarbon feedstocks. More particularly, the invention concerns a process wherein organic sulfur compounds are removed from said feedstocks in the form of hydrogen sulfide by contacting said feedstocks, in the presence of hydrogen, with a catalyst system comprising a difficulty reducible metal halide and a hydrogen halide.

2. Description of the Prior Art

It has long been recognized that the presence of impurities such as sulfur, metals, nitrogen, oxygen, resins, and the like in hydrocarbon feedstocks tend to poison or deactivate acidic catalysts which contain a refractory oxide, a noble metal, and a Lewis acid and/or a Bronsted acid component. Such catalysts may be used in reactions such as reforming, alkylation, isomerization and the like. To overcome this problem, it has been proposed that such impurities, particularly organic sulfur compounds, may be removed from hydrocarbon fractions, preferably during the hydrocarbon reaction process, by reaction in a suitable solvent. The solvent may be in either the liquid or in the vapor phase. Suitable solvents include hydrogen fluoride, boron trifluoride, sulfur dioxide and others, alone or in combination (see for example Br. Pat. No. 292,932, U.S. Pat. Nos. 2,343,841; 2,440,258; 2,450,588; 2,465,964; 2,519,587; 2,564,071 and 2,643,971).

A combination process for removing sulfur from hydrocarbon fractions is described in U.S. Pat. No. 2,689,207. In this process, the sulfur is extracted from said hydrocarbon fractions with hydrogen fluoride, the sulfur-containing extract thus formed being sent to a separate hydrogenation step wherein the sulfur in said extract is converted to hydrogen sulfide. The hydrogen sulfide is then removed, leaving a sulfur-free hydrogen fluoride/hydrocarbon liquid (the hydrocarbon extracted with the sulfur) which is recycled to the extraction stage for blending and further contacting with the original hydrocarbon fractions. More resently, U.S. Pat. No. 3,123,550 disclosed a process for removing nitrogen from distillates by hydrotreating a mixture of the distillate and a mineral acid (such as a hydrogen halide) over a supported hydrogenation catalyst.

In addition, processes involving the use of metal halide based catalysts have also been described in the prior art. For example, U.S. Pat. Nos. 2,683,763 and 2,683,764 disclose that colombium (niobium) pentafluoride or tantalum pentafluoride in combination with hydrogen fluoride can be used to refine hydrocarbon oils. In particular, sulfur compounds complexed with the metal fluoride-hydrogen fluoride catalyst are separated therefrom by heating to first remove the hydrogen fluoride, followed by subsequent dissociation of the sulfur compounds from the metal halide upon further heating. An article by Fairbrother, F. et al., J. Chem Soc., pp. 765–770, 1965 mentions the composition of tantalum pentafluoride-organic sulfur compound complexes which dissociate upon heating at temperatures below about 100° C. Another article by Olah, G. A. et al., J. Amer. Chem. Soc., Vol. 89, pp. 2296–3301, June 7, 1967 describes the protonation and cleavage of organic sulfur compounds using a fluorosulfonic acid-antimony pentafluoride catalyst system.

However, none of the foregoing prior art teaches or suggests a process for hydrodesulfurizing the organic compounds in a hydrocarbon feedstock in the presence of a metal halide-hydrogen catalyst.

SUMMARY OF THE INVENTION

It has now been found that a hydrocarbon feedstock may be refined to effect the virtual quantitative removal of organic sulfur compounds by contacting said feedstock in a reaction zone and in the presence of hydrogen with a strong acid catalyst system comprising a difficultly reducible metal halide and a hydrogen halide, at least a portion of said catalyst system being maintained in the liquid phase. This invention is particularly applicable to desulfurizing sulfur-containing hydrocarbon feedstocks. Temperatures are not critical to the practice of the present invention and can range broadly so long as at least a portion of the catalyst can be maintained in the liquid phase. Thus, the only limiting features insofar as temperatures are concerned are the melting point and the critical temperature of the catalyst components, i.e. at least a portion of the catalyst is in the liquid phase. Similarly, the only limitation on pressure is that the hydrogen partial pressure be sufficient to maintain at least a portion of the acid catalyst in the liquid phase.

Thus, when a hydrocarbon feedstock is contacted in a reaction zone with a catalyst system comprising a difficultly reducible metal halide and a hydrogen halide under the conditions previously set forth, there results a substantially sulfur-free hydrocarbon that may be in the gas and/or liquid phase, a sulfur-containing hydrogen halide liquid phase and a gas phase comprising hydrogen, hydrogen sulfide and hydrogen halide. Substantially sulfur-free hydrogen halide may then be removed from the hydrogen halide liquid phase while the substantially sulfur-free hydrocarbon may be sent to additional refinery processing. In a preferred embodiment of this invention, at least a portion of the substantially sulfur-free hydrogen halide thus recovered is recycled to the reaction zone for reuse indefinitely with only the addition of make-up quantities of hydrogen halide being required from time to time. The difficultly reducible metal halide may be recycled to the reaction zone in a solution or a slurry of, for example, the hydrogen halide, the hydrocarbon feedstock or an inert diluent. If the hydrodesulfurization has not been quantitative, the metal halide-sulfur compound complexes remaining after removal of the hydrogen halide may be thermally dissociated to remove the sulfur compounds (as is described in the U.S. Pat. Nos. 2,683,763 and 2,683,764) prior to recycling the metal halide to the reaction zone.

DETAILED DESCRIPTION OF THE INVENTION

The strong acid catalyst system referred to herein comprises a difficulty reducible metal halide and a hydrogen halide. Useful difficultly reducible metal halide constituents include the fluorides, bromides and chlorides of tantalum, niobium, tungsten, molybdenum and the chlorides and bromides of gallium and aluminum. Metal fluorides are preferred metal halides. The most preferred metal fluoride catalyst constituents are tantalum pentafluoride, niobium pentafluoride, and mixtures thereof. Tantalum pentafluoride is meant to include tantalum pentafluoride as well as other fluoride species, e.g., ions such as $Ta_2F_{11}^-$, $Ta_3F_{16}^-$ and the like, that may be formed when tantalum pentafluoride is mixed with the hydrogen halide in the presence of hydrocarbons. This applies similarly to the other metal halides.

The second component of the catalyst system is a hydrogen halide. Useful hydrogen halides include hydrogen bromide, hydrogen chloride and hydrogen fluoride. The preferred hydrogen halide is hydrogen fluoride.

The effectiveness of the strong acid catalyst referred to herein is related to the molar ratio of hydrogen halide to metal halide. While relatively minor amounts, i.e. less than equimolar amounts, of hydrogen halide relative to metal halide will dissolve at least a portion of the metal halide and thereby effect the reaction, the rate of reaction is inordinately slow. However, the reaction rate will be increased if at least an equal molar amount of hydrogen halide relative to metal halide is present in the reaction zone. Increasing the mole ratio of hydrogen halide to metal halide to metal halide provides additional hydrogen halide so as to dissolve more of the metal halide and thereby to provide an increasing amount of liquid phase catalyst which will favor an increased reaction rate. The effect of increasing amount of liquid phase catalyst on reaction rate becomes more pronounced when the mole ratio of hydrogen halide to metal halide is in excess of one and continues as the liquid phase of the catalyst increases. Thus, the mole ratio of hydrogen halide to metal halide is preferably at least 2:1 and more preferably at least 5:1. The favorable effects mentioned above will ultimately level off as the hydrogen halide dilutes the acidity of the reaction system. Thus, depending upon the relative amounts of catalyst constituents used, the catalyst, when no support is employed, may be a homogeneous solution of the metal halide in the hydrogen halide or a mixture of solid and dissolved metal halide in hydrogen halide.

The catalyst may be used as the neat liquid, as a diluted solution or as a solid, such as adsorbed on a solid support. If on a support, the catalyst may be used in a fluidized bed, in a molten salt process or suspended in a reaction mixture. With regard to the use of the catalyst in solution, any diluent or solvent may be used that is inert to the catalyst under the particular hydrocarbon conversion reaction conditions. To obtain optimum results, the diluents should be pretreated to remove catalyst poisons such as water and the like. Typical diluents or solvents include sulfur dioxide, sulfuryl chloridefluoride, sulfuryl fluoride, sulfolanes, fluorinated hydrocarbons, Freons, polyfluorinated-polyhalogenated hydrocarbons, mixtures thereof, and the like. Hydrogen fluoride is the preferred catalyst diluent when the metal halide is a metal fluoride. When a solvent or diluent is used, sufficient amounts are employed to maintain the viscosity of the catalyst mixture at a desired level. The amount of diluent employed can vary appreciably and can range as high as 98 volume % of the catalyst mixture. Preferably, the diluent:catalyst volume ratio may range from about 20:1 to 1:1. Higher dilutions may be desirable, for example, in those reactions that proceed with high exothermicity, e.g., high olefin content of the feedstock.

The catalyst may be mixed in the absence if any diluent. The components of the catalyst should be mixed separately, i.e. preferably in the absence of reactants, to avoid complexing of the sulfur compounds with the metal halide portion of the catalyst. In general, the order in which the reactants are added is not critical provided the catalyst is mixed prior to contact with the reactants.

The catalyst system may be employed with a suitable solid carrier or support. Any solid catalyst support may be used that is inert to the catalyst under the reaction conditions. If the support is not inert, the support should be pretreated, such as by heating, chemical treatment or coating, to remove substantially all water and/or hydroxylic sites that might be present. Reactive supports may be rendered inert by coating them with an inert material such as antimony trifluoride or aluminum trifluoride or by treatment with Freons, fluorine or fluorinating agents such as when hydrogen fluoride is present in the catalyst. Suitable solid supports include fluoride-treated or coated resins such as sulfonated cation exchange resins, fluoride-treated acidic chalcites such as alumina and aluminosilicates and acid-resistant molecular sieves such as faujasite and zeolites, graphite, chromosorb T, fluorinated polymers, etc.

The supported catalyst can be prepared in any suitable manner, such as by conventional methods including dry mixing, coprecipitation or impregnation. In one embodiment, the supported catalyst is prepared by impregnating a suitable deactivated support with a Lewis acid such as tantalum pentafluoride and then with a hydrogen halide such as hydrogen fluoride. The weight ratio of the Lewis acid and hydrogen halide to the support can range from 1:100 to 1:10.

In general, the hydrorefining reaction occurs in the liquid phase. The hydrocarbon feedstock, however, may be in either vapor phase, liquid phase or mixed phase. If said hydrocarbon feedstock is a liquid, the products from the reaction zone will comprise two liquid phases and a gas phase comprising hydrogen, hydrogen sulfide and hydrogen halide. The liquid phases will comprise a substantially sulfur-free hydrocarbon raffinate and a sulfur-containing acid catalyst extract. Hydrogen sulfide is evolved when the organic sulfur compounds react in the strong acid catalyst in the presence of hydrogen. The hydrogen sulfide so formed will be predominantly in the gas phase and may be, to some extent, present in the two liquid phases. If the hydrocarbon feedstock is gaseous, the products from the reaction zone will comprise a sulfur-containing acid catalyst liquid phase and a gas phase comprising hydrogen halide, hydrogen sulfide, hydrogen and substantially sulfur-free hydrocarbon. If the hydrocarbon feedstock is in mixed phase, the products from the reaction zone will comprise two liquid phases as above and a gas comprising substantially sulfur-free hydrocarbon, hydrogen, hydrogen sulfide and hydrogen halide.

While not wishing to be bound by any particular theory, it is believed that the hydrodesulfurization reaction occurs in a manner such that the acid catalyst and organic sulfur compounds combine in a type of sulfur forming neutralization reaction wherein the more acidic hydrogen halide donates a proton to the more basic sulfur atom via non-bonding electrons associated with the sulfur atom in the organic sulfur compound. The protonated organic sulfur compound then undergoes an acid catalyzed cleavage reaction to form a hydrocarbon and hydrogen sulfide and/or a lower molecular weight organic sulfur compound which can undergo further reaction to form additional hydrocarbon and hydrogen sulfide. Thus, the present invention may be applied to feedstocks containing aliphatic (including straight chained, branched and cyclic saturated and unsaturated) organic sulfur compounds singly or in combination, as well as substituted and unsubstituted aromatic organic sulfur compounds. Examples of such compounds include sulfides, mercaptans, disulfides and thiophenes. Other functional groups such as oxygen and nitrogen may also be present in the hydrocarbon feedstock and in the organic sulfur compound. However, these groups as well as the sulfur not removed from said organic compound by hydrodesulfurization will be extracted into the acid catalyst phase because the nitrogen, oxygen and sulfur atoms in said organic compounds provide a center which is a Lewis base for interaction with the acid catalyst. Thus, the term hydrorefining as used herein encompasses removal of sulfur by hydrodesulfurization and by extraction.

The process of the present invention may be applied to any hydrocarbon feedstock in either gas or liquid phase including crude oils, light hydrocarbons ($C_1$–$C_{10}$), atmospheric distillates (e.g., naphthas, gasolines, kerosenes, diesel oils, gas oils, lubricating oils or mixtures thereof), and residua which are derived from petroleum, coal, shale oil kerogen, tar sands bitumen or mixtures thereof. In view of the manner in which the reaction is believed to occur, one skilled in the art will readily recognize that the product yield will be high relative to that obtained via extraction since only sulfur is removed from the sulfur compound during hydrodesulfurization. In the case of extraction, the loss in yield could be substantial since, for example, a sulfur bearing molecule in a gasoline fraction will contain roughly three times as much hydrocarbon as there is sulfur on a weight basis. This means that a gasoline fraction containing 1 wt. % of sulfur experiences a loss of about 3 wt. % when the sulfur is removed by extraction. As the molecular weight of the fraction increases, the proportionate loss becomes greater, in that the sulfur contained in the molecule represents a lower percentage of the total weight of the molecule. The preferred feedstocks include distillates such as naphthas, gasolines, kerosenes, diesel oils and gas oils. This invention, however, may be applied advantageously to heavier feedstocks such as residua which contain higher molecular weight sulfur compounds.

Generally, a substantial portion of the distillates, that is, more than 10 volume %, preferably more than 50 volume %, more preferably more than 70%, most preferably more than 90 volume %, will boil at temperatures less than about 345° C. Preferably these distillates will boil in the temperature range of from about 25° to about 270° C and will include naphthas, kerosenes, gasolines, diesel oils and light gas oils. More preferably, the distillates will boil in the range of from about 50° to about 205° C and include naphthas, kerosenes and gasolines.

As noted above, the process of the present invention can suitably treat any hydrocarbon feedstock containing any amount of sulfur. In general, however, the process of the present invention can treat hydrocarbon feedstocks containing from about 0.001 to about 10 wt. % sulfur, preferably from about 0.001 to about 7 wt. % sulfur, more preferably from about 0.001 to about 5 wt. % sulfur, and most preferably from about 0.001 to about 3 wt. % sulfur. The preferred feedstocks may be characterized by having sulfur contents of from about 0.004 to about 0.2 wt. % for naphthas, from about 0.0025 to about 1.0 wt. % for kerosenes, from about 0.001 to about 0.5 wt. % for gasolines, and from about 0.02 to about 3.0 wt. % for gas oils. While distillates having lower molecular weight sulfur compounds are preferred, it may be advantageous to process a residua derived from a low sulfur crude that would contain a relatively low level of sulfur.

In the process of the present invention, substantially anhydrous liquid hydrogen halide should be employed. This is because substantial quantities of water present in the system cause the formation of a hydrogen halide-water azeotrope and eventual hydrolysis of the metal halide, thereby making it increasingly difficult to recover the hydrogen halide, causing a decrease in the efficiency of the catalyst system, and favoring a more corrosive environment. Accordingly, it is preferred to effect the reaction process under substantially anhydrous conditions. However, the inclusion of relatively small amounts of water can be tolerated to the extent that the hydrogen halide/water azeotrope is minimized in conjunction with the economics of the process, i.e. until the amount of acid catalyst lost due to hydrolysis or to the hydrogen halide/water azeotrope becomes uneconomical. In practice, while substantially anhydrous hydrogen halide is preferred, the hydrogen halide may contain up to about 2 wt. % of water, preferably no more than 0.5 wt. % of water.

During the hydrodesulfurization reaction, hydrogen sulfide evolution will continuously remove sulfur from the acid layer so that more than a stoichiometric amount of sulfur compound relative to metal halide can be treated. Nevertheless, it is preferred that at least a molar excess, preferably a 25% molar excess, of metal halide to sulfur in the catalyst should be maintained during the hydrodesulfurization reaction.

The hydrogen serves as a direct or indirect source to supply or replenish the hydrogen required during the hydrodesulfurization reaction to form hydrogen sulfide and evolved hydrocarbons. The amount of hydrogen present in the reaction zone must be sufficient to supply that necessary to form the hydrogen sulfide and the sulfur-free hydrocarbons evolved during the reaction. The hydrogen may be present in the form of a hydrogen-containing gas which may be obtained from any number of sources including commercially available pure hydrogen, naphtha reformers, hydrogen plants, as well as the off gases from any hydrotreating process or hydrogen donor organic molecules such as tetralin, methylcyclohexane and the like. The term hydrotreating process is meant to include hydrofining, hydrocracking and the like or synthetic schemes in which hydrogen is a product. The hydrogen-containing gas may be pure or contain other gaseous materials such as light hydrocarbons ($C_1$–$C_{10}$), carbon monoxide, carbon dioxide, hydrogen sulfide and the like. The hydrogen-containing gas may be introduced into the reaction zone alone or be mixed with the hydrocarbon feed prior to introduction into the reaction zone. Preferably the hydrogen-containing gas will be dry.

The reaction should be conducted at a temperature below the critical temperature of the hydrogen halide. The particular temperature employed may range from about the melting point of the hydrogen halide to the critical temperature of hydrogen halide. Preferably, the temperature will range from about −60° to about +175° C, most preferably from about −30° to about +100° C when hydrogen fluoride, the preferred hydrogen halide, is employed. When contacting normally gaseous hydrocarbon feedstocks containing olefinic hydrocarbons containing three or more carbon atoms and paraffinic hydrocarbons containing four or more carbon atoms, it Zmay be desired, depending upon the subsequent process in which the product will be used, to maintain temperatures below about 35° C to minimize alkylation side reactions.

The pressure at which the process is carried out is not critical to effecting the reaction and will depend upon the nature of the feedstream being processed, the temperature at which the reaction is being carried out as well as other variables. In general, the pressure should be sufficient to maintain a portion of the acid catalyst in the liquid phase. This may be expressed in terms of hydrogen partial pressure which may range from about 1 to about 100 atm., preferably from about 1 to about 50 atm., and most preferably from about 1 to about 35 atm. Generally, higher hydrogen partial pressures may be preferred for higher boiling feedstocks; e.g., gas oils and residua, to increase the degree of hydrodesulfurization. The process may be operated under a total pressure ranging from about 1 to 150 atm.

The reaction contact time required need only be that sufficient to effect a substantial hydrodesulfurization of organic sulfur compounds in the hydrogen feedstock. Thus, the contact time may vary from a few minutes to several hours depending on the temperature and other inter-related variables. Generally, the contact time will vary from 1 minute to about 5 hours, preferably 1 minute to about 2 hours, and more preferably from about 1 minute to about 30 minutes.

The hydrocarbon feedstock may be contacted with liquid acid catalyst and hydrogen in any suitable apparatus. Contacting may be effected in batch, semi-continuous or continuous operation. The contacting zone may comprise one or more reaction zones arranged in series, in parallel flow or both, with or without mechanical agitation. Equipment most suitable for a specific application can be selected by one skilled in the art from available equipment as described in, but not limited to, Sections 4 and 21 of the Fourth Edition of the "Chemical Engineers' Handbook" edited by John H. Perry (1963). The contacting equipment does not require the use of any special materials of construction at temperatures of 65° or less, i.e. carbon steel is quite satisfactory. However, at temperatures above 65° C, alloy materials such as monel, aluminum 5052 and the like, as well as Teflon, may be used, especially if water is present in the system.

After a suitable contacting period, the product from the reaction zone may be readily separated by a variety of methods which would be obvious to one skilled in the art. If the hydrocarbon feedstock is in the liquid phase, the product from the reaction zone may be separated into a substantially sulfur-free hydrocarbon raffinate, a sulfur-containing acid catalyst extract and a gas phase comprising hydrogen, hydrogen sulfide and hydrogen halide. The raffinate contains predominantly substantially sulfur-free hydrocarbon, but may also contain some untreated (not hydrodesulfurized nor extracted) organic sulfur compounds, the amount of which is dependent upon the efficiency of the reaction. The acid catalysts also have some solubility in the substantially sulfur-free hydrocarbon raffinate. In a similar manner, the acid catalyst extract contains predominantly acid catalyst but may also contain unreacted, i.e. not hydrodesulfurized, organic sulfur compounds as well as any organic nitrogen and oxygen compounds extracted from the feedstock by the acid catalyst.

If the hydrocarbon feedstock is in the gas phase, the products from the reaction zone may be separated into a liquid phase comprising sulfur-containing acid catalyst and a gas phase comprising hydrogen, hydrogen halide, hydrogen sulfide and substantially organic sulfur-free hydrocarbon. If at least a portion of the hydrocarbon feedstock is in the gas phase, the products may be separated into a sulfur-containing acid catalyst liquid phase, a substantially organic sulfur-free liquid hydrocarbon phase and a gas phase comprising hydrogen, hydrogen halide, hydrogen sulfide, and substantially sulfur-free hydrocarbon. Substantially that portion of the hydrocarbon feedstock entering the reaction zone as a vapor will be present in the gas phase. Separation of the substantially sulfur-free hydrocabon from the reaction zone may be done in any convenient manner such as settling, decanting, heating and the like, depending upon the physical properties of the feedstock.

In addition to the gas phase components mentioned above, the gas phase may also contain evolved hydrocarbons, residual organic sulfur compounds not reacted during the hydrodesulfurization reaction, organic sulfur compounds formed as intermediates during the hydrodesulfurization reaction and other gaseous components present in the hydrogen-containing gas. Evolved hydrocarbons refers to the remaining portion of the hydrocarbons evolved after hydrogen sulfide is removed from the organic sulfur compound. It should be understood that all components of the system can be present in all phases in accordance with the equilibrium solubility concentration of each component at a particular temperature and pressure of the reaction zone. Thus, the liquid phase(s) will contain dissolved gases such as hydrogen sulfide, hydrogen, hydrogen halide and the like. Similarly, the gas phase will contain some hydrogen halide and metal halide, depending upon the physical properties of each.

When at least a portion of the hydrocarbon is a liquid, the substantially sulfur-free hydrocarbon raffinate may contain small amounts of metal halide-hydrogen halide which are dissolved or dispersed therein. The removal of said hydrogen halide from the raffinate may be accomplished by heating and stripping of the hydrogen halide, which may be recycled, or by neutralization. A stripping aid such as an inert gas, e.g., CO, $CO_2$, $H_2$, $N_2$, $C_1$-$C_6$ saturated hydrocarbon or reactor tail gases may be used. Similarly, any hydrogen sulfide present in the hydrocarbon liquid may be removed by heating or neutralization. Metal halide dissolved in the hydrocarbon raffinate may be removed according to the method shown in U.S. Pat. No. 3,830,871, the disclosures of which are incorporated herein by reference. If the hydrocarbon or a portion thereof is a gas, the hydrogen sulfide may be removed therefrom by any number of known methods (see, for example, U.S. Pat. Nos. 3,709,976; 3,709,983 and 3,716,620), as may the hydrogen halide and, if desired, the hydrocarbons formed during the reaction, thereby yielding a hydrocarbon product substantially free from organic sulfur compounds.

The hydrocarbon product thus recovered comprises hydrocarbon feed from which substantialy all of the organic sulfur compounds have been removed. This corresponds to a product which contains less than 0.01 (1/100) wt. %, preferably less than 0.005 wt. %, more preferably less than 0.003 wt. %, and most preferably less than 0.001 wt. % sulfur. At least 5 wt. %, preferably at least 10 wt. %, more preferably at least 25 wt. %, and most preferably at least 50 wt. % of the sulfur content of the hydrocarbon feedstock is removed via hydrodesulfurization during the present hydrorefining process.

The substantially sulfur-free hydrocarbon is then available for further refinery processing, particularly those that employ catalyst systems that are sensitive to sulfur compounds.

The acid catalyst liquid phase contains some organic sulfur compounds removed from the hydrocarbon feedstock, any other compounds that may interact (e.g., compounds involving metals, oxygen, nitrogen, etc.) if such compounds were present in the feedstock, as well as dissolved hydrogen sulfide formed during the contacting. Recovery of the hydrogen halide from the sulfur-containing strong acid liquid and the concomitant removal of any hydrogen sulfide may be done by volatilization, since the hydrogen halide is volatile at slightly elevated temperatures, e.g., 20° C for HF, thereby leaving the metal halide with contained extracted materials. The heating step may be accomplished by simple distillation. At least a portion of the metal halide-hydrogen halide thus recovered from the various product streams by known methods such as that shown in U.S. Pat. No. 2,683,763 may then be recycled to the reaction zone to treat fresh hydrocarbon feedstock.

It should be pointed out that when the metal halide is a metal fluoride, the hydrogen halide component of the catalyst may be hydrogen fluoride, hydrogen chloride or hydrogen bromide. However, when the metal halide is a metal chloride, hydrogen fluoride cannot be used as it will convert the metal chloride to the corresponding metal fluoride. Catalyst components should be selected to avoid such undesirable exchange reactions.

The following examples are presented to further illustrate the process of the present invention and are not intended to unduly restrict the limits of the claims appended hereto.

EXAMPLE 1

Effect of Varying Hydrogen Sulfide Concentrations

Into a one liter Parr Model 4521 stirred Hasteloy C reactor, in a dry box, were placed tantalum pentafluoride (55.2 g, 0.20 mole) and 257 ml. of a feedstock containing n-hexane (235 ml, 1.8 mole) and cyclohexane (22 ml, 0.2 mole). The reactor was removed from the dry box and closed while being maintained under a nitrogen atmosphere. The reactor was partially evacuated and hydrogen fluoride (45 g, 2.3 mole) was added from a lecture bottle by direct connection. The reactor was then pressurized with hydrogen (about 0.1 mole) to 50 psig and the mixture stirred at 600 rpm. After heating to 50° C, hydrogen sulfide (0.05 mole) was added to the reactor. After stirring for 0.5 hour, a 10 cc gas sample was taken. Thereafter, another 0.05 mole portion of hydrogen sulfide (total hydrogen sulfide = 0.1 mole) was added, the reaction mixture stirred at 50° C for another 0.5 hour and another 10 cc gas sample taken. This procedure was repeated twice. The gas sample were analyzed by a mass spectrometer to give the results shown in Table 1.

Table 1

| Sample No. | 1 | 2 | 3 | 4 |
|---|---|---|---|---|
| Sample time, min. | 30 | 30 | 30 | 30 |
| Temperature, ° C | 50 | 50 | 50 | 50 |
| Total moles $H_2S$ added | 0.05 | 0.1 | 0.2 | 0.3 |
| Analysis of gas phase, vol. % | | | | |
| $H_2$ | 40.9 | 72.7 | 54.2 | 34.9 |
| Hydrocarbons | 19.5 | 14.2 | 6.9 | 17.5 |
| Air | 0.4 | 0.2 | 0.3 | 0.4 |
| $H_2S$ (1) | 0.2 | 1.8 | 36.2 | 45.0 |
| $N_2$ | 39.0 | 11.1 | 2.4 | 2.2 |
| Total (vol. %) | 100.0 | 100.0 | 100.0 | 100.0 |

(1)$H_2S$ is subject to 10% error since hydrocarbons have not been identified and are therefore estimations.

This example shows that hydrogen sulfide is not strongly protonated in the acid layer, but exists in an equilibrium with bonded and free gaseous hydrogen sulfide, because even at less than stoichiometric amounts of hydrogen sulfide relative to tantalum pentafluoride there is always a substantial amount of hydrogen sulfide in the vapor phase.

EXAMPLE 2

Hydrodesulfurization of Thiophene During Hydroisomerization with Hydrogen Fluoride-Tantalum Pentafluoride Catalyst The procedure of Example 1 was followed except that the feedstock contained 7000 wppm of sulfur as thiophene (3.36 g, 0.04 mole) and 50 g (2.5 mole) of hydrogen fluoride was present. In addition, the total pressure was 75 psig and the reactions were analyzed periodically by gas chromatography. A single sample of the gas phase was taken after 150 minutes (corresponding to liquid sample 7) and analyzed by mass spectroscopy. The results from these analyses are shown in Table 2 and Table 3.

Table 2

| Sample No. | 1 | 2 | 3 | 4 | 5 | 6 | 7 |
|---|---|---|---|---|---|---|---|
| Sample Time, min. | Feed | 0(1) | 15 | 30 | 45 | 60 | 75 | 150 |
| Temperature, ° C | 25 | 50 | 50 | 50 | 50 | 50 | 50 | 50 |
| Analysis of Hydrocarbon Liquid Phase, Vol. % | | | | | | | | |
| $C_3$ | | 0.03 | 0.09 | 0.14 | 0.15 | 0.19 | 0.17 | 0.22 |
| $i-C_4$ | | 0.05 | 0.15 | 0.29 | 0.33 | 0.38 | 0.47 | 0.63 |
| $n-C_4$ | | 0.04 | 0.08 | 0.12 | 0.13 | 0.15 | 0.18 | 0.23 |
| $i-C_5$ | | 0.06 | 0.13 | 0.22 | 0.26 | 0.33 | 0.40 | 0.58 |
| $n-C_5$ | | — | — | 0.03 | 0.03 | 0.05 | 0.06 | 0.10 |
| 2,2-$DMC_4$ | | 4.59 | 13.82 | 29.44 | 35.60 | 38.54 | 40.65 | 43.20 |
| 2,3-$DMC_4$ and 2-$MC_5$ | 0.80 | 11.69 | 23.15 | 35.09 | 35.47 | 34.73 | 34.11 | 33.31 |
| 3-$MC_5$ | 0.30 | 4.27 | 8.18 | 12.28 | 12.53 | 12.23 | 11.93 | 11.50 |
| $n-C_6$ | 89.95 | 71.53 | 47.14 | 15.75 | 9.35 | 7.82 | 7.16 | 6.60 |
| MCP | 0.10 | 0.62 | 0.99 | 1.23 | 1.18 | 1.10 | 0.95 | 0.60 |
| $C_6H_6$ | — | — | — | — | — | — | — | — |
| $C_7,C_6$ | 8.82 | 7.11 | 6.28 | 5.41 | 4.97 | 4.48 | 3.92 | 3.03 |
| Total | 99.97 | 99.99 | 100.01 | 100.00 | 100.00 | 100.00 | 100.00 | 100.00 |
| Conversions | | | | | | | | |
| wt. % 2,2-$DMC_4$ in $C_6H_{14}$'s | | 0.50 | 14.97 | 31.81 | 38.30 | 41.30 | 43.31 | 45.66 |
| $n-C_6$% Conv. | | 20.48 | 47.59 | 82.49 | 89.61 | 91.31 | 92.04 | 92.66 |

(1)Sample taken when reactor temperature reached 50° C.

Table 3

| Analysis of Gas Phase after 150 min, vol. % |  |
|---|---|
| $H_2$ | 74.3 |

Table 3-continued

| Analysis of Gas Phase after 150 min, vol. % | |
|---|---|
| Methane | 7.5 |
| Ethane | 3.3 |
| $H_2S$ | 0.5 |
| $CO_2$ | 0.2 |
| $C_3-C_6$ Hydrocarbons[1] | 14.2 |
| Total | 100.0 |
| Air | 0.4 |

[1]$C_3-C_6$ Hydrocarbons were estimated from the m/e 43 peak

This example shows that the presence of 7000 wppm of sulfur as thiophene does not poison the catalyst for isomerization and that the thiophene is undergoing hydrodesulfurization due to reaction with the catalyst since a significant amount of hydrogen sulfide has been formed and is present in the gas phase.

EXAMPLE 3

Hydrogenation of a mercaptan and a sulfide during hydroisomerization with a hydrogen fluoride-tantalum pentafluoride catalyst The procedure employed in Example 2 was followed for a feedstock containing n-hexane (235 ml, 1.8 mole), cyclohexane (22 ml., 0.2 mole), dimethylsulfide (7.3 ml, 0.1 mole) and isobutyl mercaptan (10.8 ml, 0.1 mole). The presence of the dimethylsulfide and isobutylmercaptan corresponded to about 3.4 wt. % total sulfur in the feedstock. Tantalum pentafluoride (55.2 g, 0.2 mole) and hydrogen fluoride (42 g, 2.1 mole) were present in the reactor. The reaction mixture was stirred at 600 rpm under a total pressure of 250 psig, at a temperature of 50° C. After 60 minutes no reaction was observed and the temperature was raised to 100° C. Both liquid and gas phase samples were taken at 60 and 120 minutes and analyzed as in Example 2 to give the results shown in Table 4.

Table 4

| Sample No. | 1 | 2 |
|---|---|---|
| Sample Time, min. | 60 | 120 |
| Temperature, ° C | 100 | 100 |
| Analysis of Hydrocarbon Liquid Phase, Vol. % | | |
| $C_3$ | 0.09 | 0.20 |
| $i-C_4$ | 2.54 | 3.87 |
| $n-C_4$ | 0.34 | 0.54 |
| $i-C_5$ | 0.57 | 1.06 |
| $n-C_5$ | 0.08 | 0.21 |
| 2,2-$DMC_4$ | 2.72 | 7.31 |
| 2,3-$DMC_4$ and 2-$MC_5$ | 22.30 | 36.70 |
| 3-$MC_5$ | 9.12 | 15.20 |
| $n-C_6$ | 55.55 | 28.76 |
| MCP | 1.34 | 1.91 |
| $C_6H_6$ | — | — |
| $C_yC_6$ | 5.00 | 3.47 |
| Total | 99.65 | 99.23 |
| Conversions | | |
| wt. % 2,2-$DMC_4$ in $C_6H_{14}$'s | 3.03 | 8.31 |
| $n-C_6$, % Conv. | 38.79 | 71.74 |
| Analysis of Gas Phase after 120 minutes, vol. % | | |
| $H_2$ | — | 62 |
| Hydrocarbons | — | 28.2 |
| Air | — | 1.1 |
| $H_2S$ | — | 3.8 |
| $N_2$ | — | 4.9 |
| Total (vol. %) | | 100.0 |

A small portion of the hydrocarbon product from Sample No. 2, when analyzed by microcoulometry, showed 1 wt. % sulfur present therein indicating that about 61% of the sulfur present in the feedstock had been removed.

This example shows that when stoichiometric amounts of sulfur are added to the catalyst, the reaction is temporarily inhibited while the acid reacts with the organic sulfur compounds to generate hydrogen sulfide.

What is claimed is:

1. A hydrodesulfurization process for the removal of organic sulfur compounds from a hydrocarbon feed stock which comprises contacting said feed stock in the reaction zone with hydrogen and with an acid catalyst comprising (1) a difficultly reducible metal halide selected from the group consisting of the chlorides and bromides of gallium, and the fluorides, chlorides and bromides of tantalum, niobium, tungsten, and molybdenum, and (2) a hydrogen halide selected from the group consisting of hydrogen fluoride, hydrogen chloride, or hydrogen bromide, the ratio of hydrogen halide to metal halide being at least equal molar, wherein the temperature of said reaction zone is maintained between the melting point and the critical temperature of the catalyst components for a period of time sufficient to effect hydrodesulfurization of a portion of said organic sulfur compounds.

2. The process of claim 1 wherein the acid catalyst comprises a metal fluoride selected from the group consisting of tantalum pentafluoride, niobium pentafluoride and mixtures thereof and hydrogen fluoride.

3. The process of claim 2 wherein at least a portion of said catalyst is maintained in the liquid phase.

4. The process of claim 2 wherein at least a molar excess of metal halide to sulfur is maintained in the catalyst.

5. The process of claim 2 wherein said process is effected under substantially anhydrous conditions.

6. The process of claim 2 wherein at least 10 wt. % of the sulfur present in said feed stock is removed via hydrodesulfurization.

7. A hydrodesulfurization process for the removal of organic sulfur compounds from a hydrocarbon feed stock more than 50 vol. % of which boils at a temperature less than 345° C, which comprises contacting said feed stock in a reaction zone with hydrogen and with an acid catalyst comprising a metal fluoride selected from the group consisting of tantalum pentafluoride, niobium pentafluoride and mixtures thereof and hydrogen fluoride, at least a portion of said catalyst being maintained in the liquid phase, the ratio of hydrogen fluoride to a metal fluoride being at least equal molar, wherein the temperature of said reaction zone is maintained between the melting point and the critical temperature of the catalyst components, and at a hydrogen partial pressure between 1 and 100 atmospheres for a period of time sufficient to effect hydrodesulfurization of a portion of the organic sulfur compounds.

8. The process of claim 7 wherein at least 10 wt. % of the sulfur present in said feed stock is removed via hydrodesulfurization.

9. The process of claim 7 wherein at least 25 wt. % of the sulfur present in said feed stock is removed via hydrodesulfurization.

10. The process of claim 7 wherein the hydrocarbon feed stock boils in the range of from about 25° to about 270° C.

11. The process of claim 2 wherein the hydrocarbon feedstock contains from about 0.001 to about 10 wt. % sulfur.

12. The process of claim 2 wherein the catalyst is contained on a support material.

13. The process of claim 2 wherein the hydrocarbon feedstock boils in the range of from about −185° to about 345° C.

14. The process of claim 13 wherein a hydrocarbon containing less than 0.01 wt. % sulfur is recovered from the products of the reaction zone.

15. The process of claim 2 wherein a portion of the acid catalyst used in said contacting step is recovered and at least a portion thereof is recycled to said reaction zone.

16. The process of claim 7 wherein at least a molar excess of metal halide to sulfur is maintained in the catalyst.

17. The process of claim 16 wherein the mole ratio of hydrogen halide to metal halide is at least 2:1.

18. The process of claim 7 wherein the hydrocarbon feedstock contains from about 0.001 to about 5 wt. % sulfur.

19. The process of claim 7 wherein a portion of the acid catalyst used in said contacting step is recovered and a least a portion thereof is recycled to said reaction zone.

20. The process of claim 7 wherein the hydrocarbon feedstock is a distillate selected from the group consisting of naphtha, kerosene and gasoline derived from petroleum, coal, shale oil kerogen, tar sands bitumen or mixtures thereof.

* * * * *